Dec. 14, 1965 J. J. MOON ET AL 3,222,881

FRACTIONAL CRYSTALLIZATION

Filed Jan. 14, 1963

INVENTORS
J.J. MOON
R.O. DUNN

BY

*Young and Quigg*

ATTORNEYS

United States Patent Office 3,222,881
Patented Dec. 14, 1965

3,222,881
FRACTIONAL CRYSTALLIZATION
John J. Moon and Robert O. Dunn, Bartlesville, Okla., assignors to Phillips Petroleum Company, a corporation of Delaware
Filed Jan. 14, 1963, Ser. No. 251,387
11 Claims. (Cl. 62—58)

This invention relates to the separation of multi-component mixtures. In one aspect the invention relates to the separation and purification of components of liquid multi-component mixtures. In another aspect the invention relates to a method for the transfer of heat in fractional crystallization.

The separation of chemical compounds by means of crystallization finds many applications in industrial installations. While many separations can be made by distillation or solvent extraction, there are cases where these methods are either impractical or impossible and a desired separation can be effected more advantageously by means of crystallization. Thus, in the case of chemical isomers having similar boiling points and solubilities, or materials having relatively high boiling ranges, or thermally unstable substances, separation by crystallization may be the only method which can be advantageously employed.

As well as offering in many cases the only practical method of separation, the crystallization method offers the further advantage of being the only known separation method which in the case of eutectic-forming systems theoretically produces a pure product in a single stage of operation. In actual practice, however, the crystals obtained from a solution of several components will be impure because of the occlusion of mother liquor within the crystal interstices. In the conventional fractional crystallization processes the crystal yield from one batch crystallization is redissolved in a solvent or remelted and again crystallized to effect further purification. The recrystalized product will have less impurities since the concentration of an impurity in the new liquor is less than in the previous liquir crystallization. Such processes require a large amount of equipment and floor space for their operation with resulting high operating expenditures in terms of labor and equipment costs. Furthermore, in these types of processes purity of the product is limited by the number of stages through which the process is carried.

More recently a continuous method of separating and purifying liquid multi-component mixtures has been advanced which overcomes the disadvantages of conventional fractional crystallization processes. This method involves cooling a liquid multi-component mixture from which the separation is to be made so as to form crystals of at least one component and thereafter supplying the resulting slurry to a crystal separation and purification column. In this column crystals are separated from mother liquor and then introduced into a purification section containing a melting section. The crystals are moved through the purification section toward the melting section where the crystals are melted and a portion of the melt is withdrawn as product. The remainder of the melt is displaced countercurrently to the movement of crystals and in intimate contact therewith so as to remove occulded impurities.

When practicing crystal separation and purification it is necessary to refrigerate the multi-component mixtures so as to form crystals of at least one component in a mother liquor in a crystallization forming zone. As discussed hereinbefore these crystals are then moved through the purification section toward a melting section wherein the crystals are melted. A method has now been found for employing the same heat exchange liquid for refrigerating the incoming feed to form crystals and for subsequently melting the crystals in the purification column.

It is an object of the invention to provide an improved fractional crystallization method.

Another object of the invention is to provide an improved process for the separation of components of multi-component mixtures.

Still another object of the invention is to provide an improved method for extracting heat from the incoming feed to the crystallizer and for adding heat to the purification column.

Still another object of the invention is to provide an improved method for controlling the temperature of the heating fluid in the purification column.

These and other objects, aspects and advantages of the invention become apparent to one skilled in the art upon consideration of the accompanying disclosure, claims and drawing.

It has been discovered that the liquid refrigerant used to freeze the feed component and is thus vaporized can be compressed and the energy employed to melt the crystals in the purification zone with the condensate being recycled to the crystallization zone. The compressed fluid temperature is controlled by the method of the invention by the withdrawing a sufficient amount of the fluid to maintain the temperature substantially constant.

The objects of the invention are accomplished in a process for the resolution of mixtures by crystallization comprising passing a heat exchange fluid in indirect heat exchange in a crystallization zone with a liquid mixture resolvable by crystallization and thereby cooling said mixture to a temperature sufficient to form crystals of at least one component of said mixture, removing vaporous heat exchange fluid from said zone, with drawing said crystals from said zone and introducing same into a crystal purification zone, compressing said vaporous fluid to elevate the temperature above the melting point of said crystals, passing said compressed vaporous fluid in indirect heat exchange with said crystals thereby melting said crystals and condensing at least a portion of said fluid, recovering purified melt from said purification zone, withdrawing condensed fluid, and recycling said heat exchange fluid into said crystallization zone by the improvement comprising controlling the temperature of the compressed vaporous heat exchange fluid by removing a sufficient portion to maintain said temperature substantially constant.

In one aspect of the invention the crystals are withdrawn from the purification column and melted by the compressed vaporous heat exchange fluid in a melt zone external of said purification column with a portion of the melt being recovered as product and a portion of the melt being recycled to said purification zone.

In another aspect of the invention the temperature of the compressed vaporous heat exchange fluid is controlled by removing a portion of the compressed vapor, condensing said vapor and introducing the condensate into the refrigerant condensate withdrawn from said purification zone. Preferably, the amount removed is responsive to the pressure or temperature of the compressed heat exchange flud.

In yet another aspect of the invention, the compressed superheated fluid is cooled to about the saturation point by injection of a portion of the condensate obtained by removing and condensing a portion of the compressed vapor as described in the preceding paragraph.

The process and apparatus described herein can be advantageously employed in conjunction with practically any system to which fractional crystallization is applicable. For simplification the invention is described herein primarily with reference to the concentration of beer; however, the process and apparatus of the invention are applicable to a vast number of simple binary and complex multi-component systems. The invention is particularly applicable to the separation of hydrocarbons which have practically the same boiling point and are, therefore, difficult to separate by distillation. Where high-boiling organic compounds are concerned, separation by distillation is often undesirable because many such compounds are unstable at high temperatures. One particularly advantageous application of the process lies in its use with systems which exhibit large changes in solids content with small changes in temperature, such as with a mixture containing 85 mol percent or more 2-methyl-5-vinylpyridine, with normal paraffins, or with a system containing a high percentage of water. In order to illustrate some of the systems to which the invention is applicable the following compounds are grouped with respect to their boiling points.

GROUP A

|  | B.P.,° C. | F.P.,° C. |
|---|---|---|
| Benzene | 80 | 5.5 |
| n-Hexane | 69 | −94 |
| n-Heptane | 98.52 | −90.5 |
| Carbon tetrachloride | 77 | −22.8 |
| Acrylonitrile | 79 | −82 |
| Ethyl alcohol | 78.5 | −117.3 |
| 2,2-dimethylpentane | 79 | −125 |
| 3,3-dimethylpentane | 86 |  |
| Methyl ethyl ketone | 79.6 | −86.4 |
| Methyl propionate | 79.9 | −87.5 |
| Methyl acrylate | 80.5 |  |
| 1,3-cyclohexadiene | 80.5 | −98 |
| 2,4-dimethylpentane | 80.8 | −123.4 |
| 2,2,3-Trimethylbutane | 80.9 | −25 |
| Cyclohexane | 81.4 | 6.5 |
| Acetonitrile | 82 | −42 |
| Cyclohexene | 83 | −103.7 |
| 2-methylhexane | 90 | −119 |
| 3-methylhexane | 89.4 | −119.4 |

GROUP B

|  | B.P.,° C. | F.P.,° C. |
|---|---|---|
| Methyl cyclohexane | 100.3 | −126.3 |
| Cyclohexane | 81.4 | 6.5 |
| n-Heptane | 98.52 | −90.5 |
| 2,2,4-trimethylpentane (isooctane) | 99.3 | −107.4 |
| Nitromethane | 101 | −29 |
| p-Dioxane | 101.5 | 11.7 |
| 2-pentanone | 101.7 | −77.8 |
| 2-methyl-2-butanol | 101.8 | −11.9 |
| 2,3-dimethylpentane | 89.4 |  |
| 3-ethylpentane | 93.3 | −94.5 |

GROUP C

|  | B.P.,° C. | F.P.,° C. |
|---|---|---|
| Toluene | 110.8 | −95 |
| Methylcyclohexane | 100.3 | −126.3 |
| 2,2,3-tetramethyl butane | 106.8 | 104 |
| 2,5-dimethylhexane | 108.25 | −91 |
| 2,4-dimethylhexane | 110 |  |
| 2,3-dimethylhexane | 113.9 |  |
| 3,4-dimethylhexane | 116.5 |  |
| 3-ethyl-2-methylpentane | 114 |  |
| 3-ethyl-3-methylpentane | 119 |  |

GROUP D

|  | B.P.,° C. | F.P.,° C. |
|---|---|---|
| Aniline | 184.4 | −6.2 |
| Toluene | 110.8 | −95 |
| Benzene | 80.0 | 5.5 |

GROUP E

|  | B.P.,° C. | F.P.,° C. |
|---|---|---|
| Carbon tetrachloride | 77 | −22.8 |
| Chloroform | 61 | −63.5 |
| CS$_2$ | 46.3 | −108.6 |
| Acetone | 56.5 | −95 |

GROUP F

|  | B.P.,° C. | F.P.,° C. |
|---|---|---|
| Ortho-xylene | 144 | −27.1 |
| Meta-xylene | 138.8 | −47.4 |
| Para-xylene | 138.5 | 13.2 |

GROUP G

|  | B.P.,° C. | F.P.,° C. |
|---|---|---|
| Ortho-cymene | 175.0 | −73.5 |
| Meta-cymene | 175.7 | −25 |
| Para-cymene | 176.0 | −73.5 |

GROUP H

|  | B.P.,° C. | F.P.,° C. |
|---|---|---|
| Dimethyl phthalate | 282 | 5.5 |
| Dimethyl isophthalate | 124 (12 mm.) | 67 |
| Dimethyl terephthalate | 288 | 140.6 |

GROUP I

|  | B.P.,° C. | F.P.,° C. |
|---|---|---|
| Ortho-nitrotoluene | 222.3 | −10.6 / −4.1 |
| Meta-nitrotoluene | 231 | 15.5 |
| Para-nitrotoluene | 238 | 51.3 |

Mixtures consisting of any combination of two or more of the components within any one of the groups can be resolved by the process of the invention, as can mixtures made up of components selected from different groups. For example, benzene can be separated from a benzene-n-hexane or a benzene-n-heptane mixture in which the benzene is present in an amount greater than the eutectic concentration. In the same manner, para-xylene may be readily separated from a mixture of para- and meta-xylenes or from para-, meta-, or ortho-xylenes. Benzene can also be separated from a mixture thereof with toluene and/or aniline. Multi-component mixtures which can be effectively resolved so as to recover one or more of the components in substantially pure form include mixtures of at least two of 2,2-dimethylpentane, 2,4-dimethylpentane, and mixtures of at least two of carbon tetrachloride, chloroform, and acetone. The invention is also applicable to the separation of individual components from a system of cymenes.

This invention can also be utilized to purify naphthalene, hydroquinone (1,4-benzenediol), paracresol, paradichlorobenzene, and such materials as high melting waxes, fatty acids, and high molecular weight normal paraffins. The invention can also be used to resolve a mixture comprising anthracene, phenanthrene, and carbazole. Furthermore, the invention can be used to separate durene (1,2,4,5-tetramethylbenzene) from $C_{10}$ aromatics.

It is not intended however to limit the invention to organic mixtures but rather it is applicable to inorganic mixtures as well and offers a practical method of separating two inorganic components between which solvates or hydrates are formed. Examples of inorganic systems to which this invention is particularly applicable are those for the recovery of pure salts such as ammonium nitrate and of anhydrous salts from their hydrates.

In certain instances it is particularly desirable to recover the mother liquor separated from the crystals as a product of the process. This situation arises where it is desired to increase the concentration of a dilute solution. This aspect of the invention is especially applicable to the production of concentrated food products which involves primarily the removal of water from these products. Accordingly, by utilizing the process and apparatus of this invention, water can be removed from fruit juices such as grape, orange, lemon, pineapple, apple and tomato. It is also possible to concentrate vegetable juices and beverages such as milk, beer, wine, coffee and tea by this method.

For a more complete understanding of the invention reference is now made to the following description and to the drawing, which is an elevational view of an illustrative fractional crystallization apparatus suitable for practice of the present invention.

Figure 1:
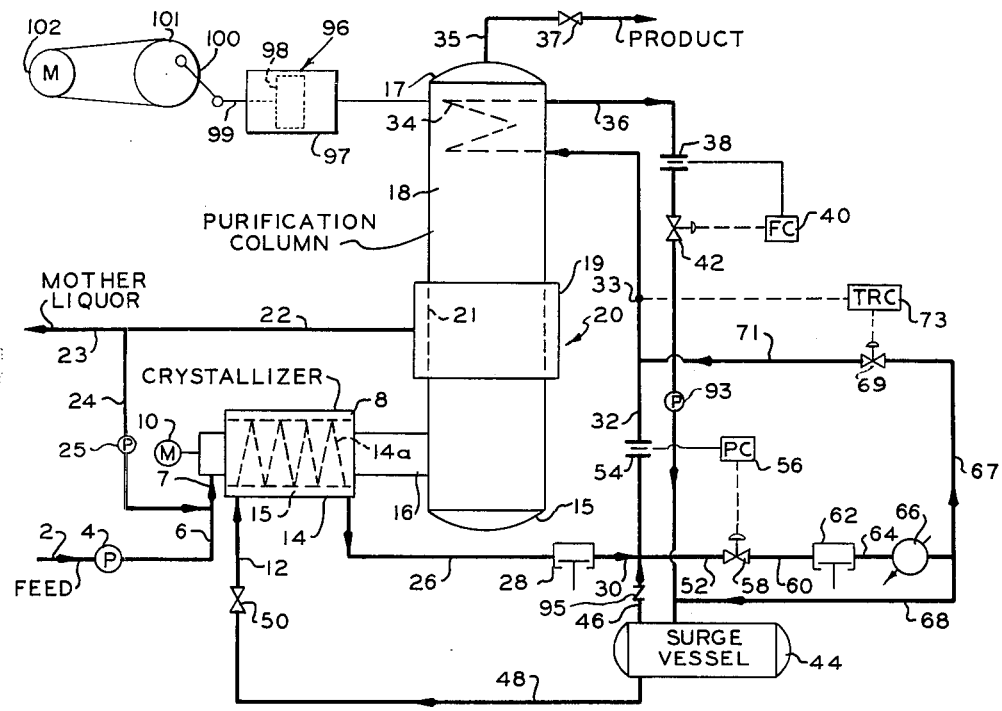
FIGURE 1 represents a system showing the cooling of the feed in a crystallizer and melting of the crystals within the purification column with a single heat exchange fluid.

Referring to the drawing FIGURE 1, an elongated crystal purification column 18 is closed at its upper and lower ends by closure members 17 and 15, respectively. Filter section 20 disposed in an intermediate portion of column 18 comprises a filter medium, such as a filter screen 21, surrounded by jacket 19. Jacket 19 has a line 22 connected thereto for the withdrawal of liquids from the filter section. In the concentration of beer and the like the product is removed as the mother liquor stream through lines 22 and 23. Some of the mother liquor may be recycled to feed line 7 through conduit 24 and pump 25. The portion of column 18 below filter section 21 and in communication therewith comprises the feed section. The heat exchange means, e.g., a coil 34 through which the heat transfer medium is circulated, is positioned in the upper end of column 18 in order to provide a crystal melting section in that end of the column. However, other suitable means can be employed and it is not intended to limit the invention to this specific heating means.

Feed line 2 leading from a source of feed material (not shown) containing pump 4 is connected to the inlet of the chiller, or crystallizer, 8 by conduits 6 and 7. Chiller 8 can be any conventional type of refrigerating or crystal-forming means such as a scraped-surface chiller. As illustrated, the chiller can comprise a cylindrical member having positioned therein means for removing crystal slurry formed therein through the chiller, such as an auger 14a connected to motor 10. The chiller is closed on its outer end while its other end is connected to column 18 at a point below filter section 21 by cylindrical member 16. The chiller 8 is encompassed by a jacket 14 which forms an annulus 15 through which a refrigerant is continuously passed by means of inlet 12 and outlet 26 connected to the jacket. Obviously it is within the scope of the invention to employ any type of coolant desirable to cool the multi-component mixture to the necessary level. For instance, when cooling beer to increase the concentration it is frequently desirable to use ammonia. Other preferred refrigerants include ethane, ethylene, propylene, propane, isobutane, the butenes such as 1-butene, the butadienes such as 1,3-butadiene, the butynes such as ethylacetylene, the various polychlorofluoromethanes (Freons), halogenated hydrocarbons such as ethylchloride and the like.

In the practice of the invention the liquid feed is pumped from a source not shown by pump 4 into chiller 8. Chiller 8 is maintained at a temperature sufficiently low to crystallize a portion of one of the components to form a slurry of crystals and mother liquor. In one suitable method the amount of cooling is adjusted by controlling the effluent solids content.

The slurry of solids is introduced by means of an auger 14a into the lower portion of the purification column 18. While the apparatus has been shown for the sake of clarity and understanding as occupying a substantially vertical position with the purification section in the upper end portion, it is not intended to so limit the invention. It is to be understood that the apparatus can be otherwise disposed without departing from the spirit and scope of the invention. Thus the operation of the purification column can be positioned horizontally or the column can be operated vertically with the melting zone in the lower portion of the column rather than in the upper column as illustrated.

Upon introduction of this slurry into column 18, the slurry is moved upward by any suitable means, as in Thomas Patent 2,854,494. Within filter section 20 mother liquor is separated from the crystals and removed from the column through line 22. The crystals thereafter continue their movement as a uniform mass upwardly through the column. The crystals melt upon entering the melting zone due to the thermal energy supplied by heating coils 34. The melting zone is maintained at a temperature at least as high as the melting point of the crystals by continuously circulating the indirect heat exchange medium through the coil of the heating means. On reaching the melting zone at least a portion of the crystals is melted and a portion of the resulting melt is displaced downwardly as reflux stream into the upwardly moving mass of crystals. The reflux stream on contacting the crystals displaces occluded impurities from the crystals. The melt is then withdrawn from the melting zone through line 35 and valve 37. In the case of a beverage such as beer, etc., the concentrate is removed through outlet 22 and nearly pure water is removed from the upper portion of the column through line 35.

Any suitable means can be utilized to subject the materials in the purification column to intermittent pressure pulsations. One such suitable means 96 is disclosed in Thomas 2,854,494 and comprises a cylinder 97, one end of which is in fluid communication with column 18 and a reciprocatable piston 98 mounted within cylinder 97. Reciprocation of piston 98 can be produced by any suitable means, for example by an electric motor 102, belt 103, crank 101, and connecting rods 99 and 100.

The liquid refrigerant introduced into the crystallizer 8 through conduit 12 passes through the annulus 15 and chills the incoming feed so as to form crystals and vaporizes. The vaporous refrigerant is then removed through conduit 26 and compressed in compressor 28 to provide a temperature at least sufficient to melt the crystals in the upper portion of purification column in the heat exchange means 34. For example, in the case of beer this temperature is in the range of 35° F. to 100° F. The still vaporous refrigerant is then transferred through conduits 30, 32 through the heat exchange coils 34 and condensed and the condensate removed through conduit 36. The flow of vaporous refrigerant through the coils 34 may be conveniently controlled based upon the amount of condensate. Orifice meter 38 determines the flow of condensate in line 36 and transmits a signal to flow controller 40 proportional to said flow which actuates motor valve 42 so as to control the flow of condensate and thus the amount of refrigerant flowing through coils 34. The condensed refrigerant is then introduced, if desired, into a surge vessel 44 by means of pump 93. A bleed line 46 containing value means 95 is connected to conduit 30. As needed the condensed refrigerant is withdrawn from surge vessel 44 through conduit 48 and is cooled by any suitable means, such as expansion valve 50, and is reintroduced into chiller 8. By this method it is thus possible to employ the same heat exchange fluid both for the crystallizer and for the purification column heating.

In another aspect of the invention it is also possible to take into consideration the amount of heat leak and the amount of external heat supplied to the system by the compressor 28. Thus, it is possible by this method to control the temperature of the compressed vaporous refrigerant supplied to conduit 34 by compressor 28. In this method a portion of the compressed vaporous refrigerant is withdrawn from conduit 30 through conduit 52 and is passed through valve 58 which is actuated by a signal proportional to the pressure from a pressure sensing means, e.g., pressure tap 54, through pressure controller 56, the refrigerant then passes through conduit 60 and is compressed by compressor 62. The compressed fluid then passes through conduit 64 and is condensed against water or the like in heat exchanger 66 and returned to the condensate line through conduit 68.

Preferably, a gaseous fluid at its vaporization temperature is passed in indirect heat exchange with the melt at a sufficiently high velocity so that less than 25 weight percent of the heating fluid is condensed. This provides for a substantially uniform distribution of heat in the melting section and thus a more accurate control of the temperature of the melt.

Since compressing the vaporous heat exchange fluid by compressor 28 will result in a superheated fluid and since superheated fluids are not generally the most efficient fluids for transfer of heat in coils 34, it is generally preferred to cool said compressed fluid so that it is about its saturation point. One suitable method of cooling the compressed fluid is to withdraw a portion of the compressed fluid and condense it as hereinbefore described. The condensate is then removed through line 67, valve 69 and line 71 and introduced into line 32. The amount of condensate so employed may be varied depending, e.g., on the temperature of the fluid entering the coils 34. For example, temperature sensing means 33 transmits a signal to temperature recorder controller 73 proportional to the temperature in conduit 32. Temperature recorder controller 73 then actuates motor valve 69 to increase the flow of condensate when the temperature increases and vice versa.

Figure 2:
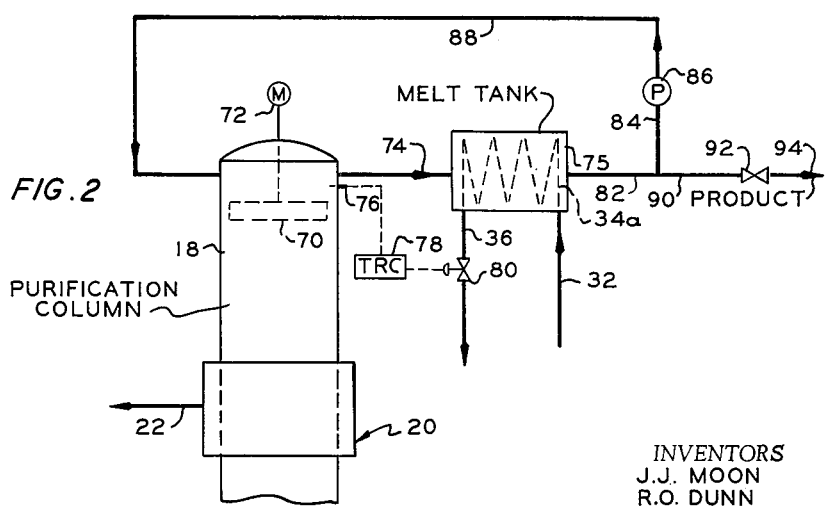
FIGURE 2 illustrates a system wherein the method of the invention is employed in the melting of the crystals external of the purification column with the same heat exchange fluid used in the crystallizer.

By another embodiment of the invention, it is possible to obtain the advantage of the invention where the melting of the crystals occur external of the purification column. In other words, a portion of the crystals, or all of the crystals, are withdrawn from the upper portion of the purification column and melted externally of the column and a portion of the melt recycled to the purification column. As shown in the drawing, FIGURE 2, an ice-cutting means 70 is driven by motor 72. This ice-cutting means removes the upper, purified portion of the advancing ice mass and forms a slurry in the subsequently introduced melt. The slurry is withdrawn through conduit 74 into a melt tank 75. The compressed vaporous refrigerant in conduit 32 is passed through indirect heat exchange coils 34a, condensed and withdrawn through conduit 36 and motor valve 80. Motor valve 80 is actuated in response to a signal from a temperature sensing means 76 disposed in the slurry in the upper portion of the purification column. This signal, which is proportional to the temperature of the slurry, is transmitted to a temperature recorder controller 78 which actuates motor valve 80 to regulate flow of refrigerant so as to maintain substantially constant temperature of the melt. The melt from the melt tank 75 is withdrawn through conduit 82 and a portion thereof is removed as product through conduit 90, valve 92 and conduit 94. The remainder of the liquid is recycled through conduit 84, pump 86 and conduit 88 into the purification column.

While the instant invention has been described in conjunction with a particular crystal purification column it is not intended to so limit the invention.

A more comprehensive understanding of the invention may be obtained by reference to the following illustrative examples.

In order to describe the process of this invention in greater detail, reference is made to a specific procedure for the concentration of beer. The feed stream of the beer to be concentrated is supplied through line 2, pump 4 and lines 6, 7. The beer is chilled in chiller 8 until the temperature is reduced to about 14° F. The slurry removed from chiller 8 contains about 37 weight percent ice crystals. The ice crystals are permitted to grow and are eventually introduced into column 15. The mother liquor removed through line 22 is at a temperature of about 14° F.

A material balance of the system based on introduction of feed at the rate of 107 gallons per hour is set forth in the following table.

Table

| Component | Beer feed | Recycle M.L. | Chiller feed | Column feed | Column mother liquor | Concentrate product | Water |
|---|---|---|---|---|---|---|---|
| Conduit | 2 | 24 | 7 | 16 | 22 | 23 | 35 |
| Ethyl alcohol [1] | 34 | 136 | 170 | 170 | 170 | 34 | Tr |
| Soluble solids [1] | 45 | 180 | 225 | 225 | 225 | 45 | Tr |
| Water (liquid) [1] | 813 | 592 | 1,405 | 739 | 739 | 147 | 666 |
| Water (ice) [1] | | | | 666 | | | |
| Total, lb./hr | 892 | 908 | 1,800 | 1,800 | 1,134 | 226 | 666 |
| GPH (flowing) | 107 | 109 | 216 | 223 | 136 | 27 | 80 |
| Weight percent ice | | | | 37.0 | | | |
| Weight percent alcohol | 3.96 | 18.7 | 10.8 | | 18.7 | 18.7 | 0.05 |
| Temperature, °F | 40 | 14 | 23 | 14 | 14 | 14 | 40 |
| BPH [2] | 3.5 | 3.5 | 7.0 | 7.2 | 4.4 | 0.9 | 2.6 |

[1] Lb./hr.  [2] Barrels per hour.

Based on preceding material balance, the amount of heat to be removed in chiller 8 in order to cool the beer feed from 23° F. to 14° F. is calculated as follows:

$$Q_w = (W_w)(CP_w)(\Delta T_w) + (F_s)(W_w)(L_f) + Q_L$$

where $Q_w$ = heat removed in chiller, B.t.u./hr.
$W_w$ = beer rate, lbs./hr.
$\Delta T_w$ = temperature decrease of beer in chiller, °F.
$CP_w$ = specific heat of liquid beer, B.t.u./lb./°F.
$F_s$ = fraction of ice crystals formed in chiller
$L_f$ = heat of fusion of water, B.t.u./lb.
$Q_L$ = heat leak into chiller, B.t.u./hr.

Substituting, $Q_w = (1800)(0.865)(23-14) + (1800)(0.37)(144) + 5,000$
$Q_w = 115,000$ B.t.u./hr.

Ammonia flow required to remove 115,000 B.t.u./hr. is calculated as follows:

$$W_a = \frac{Q_w}{L_A}$$

where $W_A$ = ammonia rate, lbs./hr.
$Q_w$ = heat removed in chiller, B.t.u./hr.
$L_A$ = heat of vaporization of ammonia, B.t.u./lb.
    = 527 B.t.u./lb. for ammonia boiling at −10° F. and 24 p.s.i.a.

Substituting, $$W_A = \frac{115,000}{527.0}$$

= 218 lbs./hr.

The ammonia vapor is then compressed to 95 p.s.i.a. and a temperature of 163° F. This superheated vapor flow is divided with 178 pounds flowing to melt zone 34 and 40 pounds flowing to compressor 62. It is desirable, but not necessary, to remove the superheat from the ammonia flowing to melt coil 34. This is accomplished by adding 26 pounds of liquid ammonia at 110° F. and a pressure of 246 p.s.i.a. to the aforementioned 178 pounds from compressor 28. This gives a mixture of saturated ammonia vapor with a temperature of 53° F. and a pressure of 95 p.s.i.a. This flows through coil 34 where it is condensed to form liquid ammonia at a temperature of 51° F. and a pressure of 91 p.s.i.a.

Forty pounds per hour of ammonia vapor from compressor 28 is passed to compressor 62, and compressed to 246 p.s.i.a., and cooled to 110° F. by cooler 66. 26 pounds of this condensate is introduced into melt coil 34 through line 32, and the remaining 14 pounds pass to surge tank 44. Product water leaves at 40° F. through line 35.

While certain examples, structures, composition and process steps have been described for purposes of illustration the invention is not limited to these. Variation and modification within the scope of the disclosure and the claims can readily be effected by those skilled in the art.

We claim:

1. In a process for the resolution of mixtures by crystallization comprising passing a heat exchange fluid in indirect heat exchange in a crystallization zone with a liquid mixture resolvable by crystallization and thereby cooling said mixture to a temperature sufficient to form crystals of at least one component of said mixture and vaporizing said fluids, removing the resulting vaporous heat exchange fluid from said zone, withdrawing said crystals from said zone and introducing the thus withdrawn crystals into a crystal purification zone, compressing said vaporous heat exchange fluid to elevate the temperature thereof to above the melting point of said crystals, passing a stream of the thus compressed vaporous heat exchange fluid in indirect heat exchange with said crystals in said purification zone thereby melting said crystals and condensing at least a portion of said stream of compressed heat exchange fluid, withdrawing the resulting at least partially condensed heat exchange fluid from said crystallization zone, and recycling said at least partially condensed heat exchange fluid to said crystallization zone, the improvement comprising measuring the pressure of said stream of compressed vaporous heat exchange fluid, and controlling said pressure of said stream of compressed vaporous heat exchange fluid by removing responsive to the thus measured pressure a sufficient portion of said compressed vaporous heat exchange fluid from said stream to maintain said pressure substantially constant.

2. A process in accordance with claim 1 further comprising at least partially condensing said portion of said compressed vaporous heat exchange fluid and introducing the thus at least partially condensed portion into said at least partially condensed heat exchange fluid.

3. A process in accordance with claim 1 wherein said compressed heat exchange fluid is superheated, and said pressure is controlled by removing responsive to said measured pressure a portion of the compressed vaporous heat exchange fluid from said stream, further comprising at least partially condensing said portion of the compressed vaporous heat exchange fluid from said stream, measuring the temperature of said stream, introducing at least a first portion of the thus at least partially condensed portion of said compressed vaporous heat exchange fluid into said stream upstream of the point of said measuring the temperature of said stream, varying the amount of said first portion responsive to the thus measured temperature to maintain said measured temperature substantially constant.

4. A process in accordance with claim 3 further comprising introducing the remainder of said thus at least partially condensed portion of said compressed vaporous heat exchange fluid into said at least partially condensed heat exchange fluid withdrawn from said purification zone.

5. In a process for the resolution of mixtures by crystallization comprising introducing a liquid mixture resolvable by crystallization into a crystallization zone, passing a liquid heat exchange fluid in indirect heat exchange with said mixture thereby cooling said mixture and forming a slurry of crystals of at least one component in a mother liquor and vaporizing said heat exchange fluid, removing the thus produced vaporous heat exchange fluid from said zone, withdrawing said slurry from said zone and introducing the thus withdrawn slurry into one end portion of a crystal purification zone, separating and withdrawing mother liquor from said purification zone, compressing said vaporous heat exchange fluid to elevate the temperature thereof to above the melting point of said crystals, passing a stream of the thus compressed vaporous heat exchange fluid in indirect heat exchange with the crystals in the opposite end portion of said purification zone thereby melting the crystals contained in said opposite end portion and condensing at least a portion of said stream of compressed heat exchange fluid, subjecting materials in said purification zone to intermittent pressure pulsations, recovering purified melt from said opposite end portion, withdrawing the thus at least partially condensed heat exchange fluid from said indirect heat exchange with the crystals in said opposite end portion, cooling the thus withdrawn at least partially condensed heat exchange fluid by expansion and recycling said thus cooled heat exchange fluid to said crystallization zone, the improvement comprising measuring the pressure of said stream of compressed vaporous heat exchange fluid, and controlling the pressure of the compressed vaporous heat exchange fluid passing in said indirect heat exchange with said crystals in said opposite end portion by removing responsive to the thus measured pressure a sufficient portion of said stream to maintain said measured pressure substantially constant.

6. The process of claim 5 wherein said pressure is controlled by removing responsive to said measured pressure a portion of the compressed vaporous heat exchange fluid from said stream, condensing the thus removed portion of said stream and introducing the resulting condensate into the at least partially condensed heat exchange fluid withdrawn from said indirect heat exchange with said crystals in said opposite end portion.

7. The process of claim 6 wherein said compressed heat exchange fluid is superheated and further comprising cooling said stream to about its saturation point before the passage thereof in indirect heat exchange relationship with said crystals in said opposite end portion.

8. A process in accordance with claim 6 wherein said compressed heat exchange fluid in superheated, and further comprising measuring the temperature of said stream, and introducing a portion of said condensate into said stream upstream of the point of said measuring the temperature of said stream, the amount of said portion of said condensate being varied responsive to the thus measured temperature to maintain said measured temperature substantially at the saturation temperature of said stream.

9. In a process for the resolution of mixtures by crystallization comprising introducing a liquid mixture resolvable by crystallization into a crystallization zone, passing a liquid heat exchange fluid in indirect heat exchange with said mixture thereby cooling said mixture and forming a slurry of crystals of at least one component in a mother liquor and vaporizing said heat exchange fluid, removing the thus produced vaporous heat exchange fluid from said zone, withdrawing said slurry from said zone and introducing the thus withdrawn slurry into one end portion of a crystal purification zone, separating and withdrawing mother liquor from said purification zone, subjecting the materials of said purification zone to intermittent pressure pulsations, withdrawing said crystals from the opposite end portion of said purification zone and introducing the thus withdrawn crystals into an external melting zone, compressing said vaporous heat exchange fluid to elevate the temperature thereof to above the melting point of said crystals, passing said a stream of the thus compressed vaporous heat exchange fluid in indirect heat exchange in said melting zone with said crystals thereby melting said crystals to form a melt and condensing at least a portion of said stream of compressed vaporous heat exchange fluid, recycling a portion of said melt to said opposite end portion of said purification zone, recovering a portion of said melt, withdrawing the at least partially condensed heat exchange fluid from said melting zone, cooling said at least partially condensed heat exchange fluid by expansion and recycling said thus cooled heat exchange fluid to a crystallization zone, the improvement comprising measuring the pressure of said stream and controlling the pressure of said stream of compressed vaporous heat exchange fluid by removing responsive to the thus measured pressure a sufficient portion of said stream to maintain said measured pressure substantially constant.

10. The process of claim 9 wherein said stream of compressed vaporous heat exchange fluid is cooled to about its saturation temperature prior to passage thereof through said indirect heat exchange in said melting zone with said crystals.

11. The process of claim 9 wherein the pressure of said stream is controlled by removing a portion of said compressed vaporous heat exchange fluid, condensing the thus removed portion of said compressed vaporous heat exchange fluid and introducing the resulting condensate into the at least partially condensed stream of heat exchange fluid withdrawn from said purification zone, the amount of removal being responsive to said measured pressure of said stream.

References Cited by the Examiner
UNITED STATES PATENTS

| | | |
|---|---|---|
| 1,931,347 | 10/1933 | Gay. |
| 2,666,304 | 1/1954 | Ahrel. |
| 2,894,997 | 7/1959 | Hachmuth. |
| 2,895,835 | 7/1959 | Findlay. |
| 3,132,096 | 5/1964 | Walton _____ 62—58 |

NORMAN YUDKOFF, *Primary Examiner.*